ELECTRONIC FLAW-DETECTING DEVICE

Filed Jan. 18, 1954 7 Sheets-Sheet 1

INVENTOR.
Herman A. Ortegren
Marvin J. Minter.
Barthel + Bugbee
Attys

Nov. 18, 1958 H. A. ORTEGREN ET AL 2,860,777

ELECTRONIC FLAW-DETECTING DEVICE

Filed Jan. 18, 1954 7 Sheets-Sheet 2

INVENTOR.
Herman A. Ortegren
BY Marvin J. Minter
Barthel & Bugbee
Attys

Nov. 18, 1958 H. A. ORTEGREN ET AL 2,860,777

ELECTRONIC FLAW-DETECTING DEVICE

Filed Jan. 18, 1954 7 Sheets-Sheet 3

INVENTOR.
Herman A. Ortegren
Marvin J. Minter
BY Barthel & Bugbee
Attys

ELECTRONIC FLAW-DETECTING DEVICE

Filed Jan. 18, 1954 7 Sheets-Sheet 4

INVENTOR.
Herman A. Ortegren
BY Marvin J. Minter
Barthel + Bugbee
Attys

ELECTRONIC FLAW-DETECTING DEVICE

INVENTOR.
Herman A. Ortegren
BY Marvin J. Minter
Barthel & Bugbee
Attys

ELECTRONIC FLAW-DETECTING DEVICE

INVENTOR.
Herman A. Ortegren
BY Marvin J. Minter
Barthel & Bugbee
Attys

Nov. 18, 1958 H. A. ORTEGREN ET AL 2,860,777

ELECTRONIC FLAW-DETECTING DEVICE

Filed Jan. 18, 1954 7 Sheets-Sheet 7

INVENTOR.
Herman A. Ortegren
BY Marvin J. Minter
Barthel + Bugbee
Attys

United States Patent Office 2,860,777

Patented Nov. 18, 1958

2,860,777

ELECTRONIC FLAW-DETECTING DEVICE

Herman A. Ortegren, Grosse Pointe, and Marvin J. Minter, Detroit, Mich., assignors, by mesne assignments, to Federal-Mogul-Bower Bearings, Inc., Detroit, Mich., a corporation of Michigan

Application January 18, 1954, Serial No. 404,478

9 Claims. (Cl. 209—72)

This invention relates to flaw-detecting devices and, in particular, to electronically-operated flaw-detecting devices.

One object of this invention is to provide an electronic flaw-detecting device which will indicate the presence of flaws in metallic workpieces passing close to a scanning device, even surface flaws which are so minute as to be undetectable by a cursory visual inspection.

Another object is to provide an electronic flaw-detecting and inspecting device which not only detects flaws quickly and rapidly in workpieces passing close to a scanning device, but which also separates such faulty workpieces from perfect workpieces.

Another object is to provide an electronic flaw-detecting device which employs an electrical or magnetic transducer which actuates an electronic circuit, the balance of which is upset when a flaw in a workpiece passes the transducer, so as to signal the presence of the faulty workpiece and eject it from the remaining workpieces.

Another object is to provide an electronic flaw-detecting device wherein the workpieces are caused to pass a transducer and are halted momentarily while they are rotated adjacent the transducer, so as to present the entire lateral surface of the workpiece to the scanning action of the transducer, with the result that a surface flaw, such as a crack, disturbs the equilibrium of the electronic circuit connected to the transducer and actuates either an alarm circuit or an ejector circuit which ejects the faulty workpiece from the procession of workpieces passing the transducer.

Another object is to provide an electronic flaw-detecting device of the foregoing character wherein the transducer consists of a coil connected to a high frequency electronic circuit which remains in resonance so long as perfect workpieces are presented to and scanned by the transducer, but wherein the presence of a flaw, such as a crack, upsets the frequency of the circuit and consequently upsets the resonance thereof, causing a reaction in the circuit which actuates an alarm signal device which may either merely indicate the presence of a faulty workpiece or may actuate mechanism which positively ejects the faulty workpiece.

Another object is to provide an electronic flaw-detecting device of the foregoing character wherein the transducer is located in a tuned high frequency circuit possessing both inductance and capacity, the circuit remaining stable while perfect workpieces are scanned by the transducer, but becoming momentarily unstable when a flaw in a workpiece passes the transducer and which resumes its stable condition following the removal or ejection of the faulty workpiece.

Another object is to provide an electronic flaw-detecting device of the foregoing character wherein mechanism is provided for intermittently feeding the workpieces to the machine rotating the workpieces while they are being momentarily halted in their travel past the transducer, the circuit setting up an electro-magnetic field in the vicinity of the transducer through which the workpiece passes.

Another object is to provide a modified electronic flaw-detecting device which will indicate the presence of flaws in both the sides and one or more ends of metallic workpieces passing close to a plurality of scanning devices of the foregoing character.

Another object is to provide an electronic flaw-detecting device of the foregoing character wherein the driving surface of the driving wheel for rotating the workpiece is so related geometrically to the driven surface of the workpiece as to impart the same circumferential surface speed to both ends of the workpiece, in order to avoid "skidding" of the workpiece during rotation and consequently to eliminate disturbances in the electronic circuit not caused by defects in the workpiece but arising from such skidding or bouncing of the workpiece at the transducer—specifically, with a tapered or conical workpiece, to employ a conical driving surface on the driving wheel which has its apex coinciding with the apex of the conical surface of the workpiece.

Another object is to provide an electronic flaw-detecting device of the foregoing character wherein loading and unloading of the workpieces occur simultaneously, thereby saving time and consequently increasing the speed of operation of the device.

Other objects and advantages of the invention will become apparent during the course of the following description of the accompanying drawings wherein.

*General arrangement*

Figure 1:
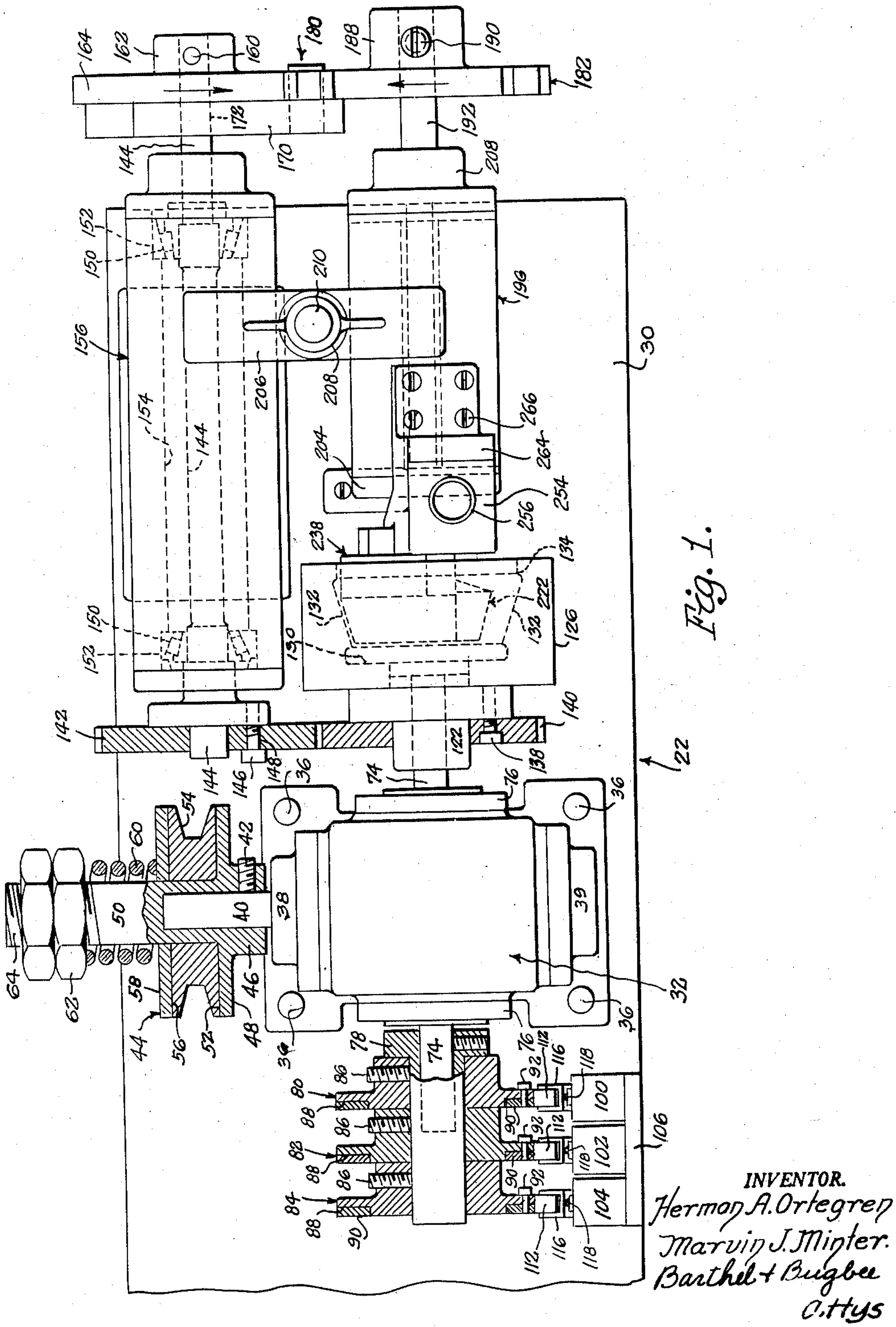
Figure 1 is a top plan view, partly in horizontal section, of the work-handling and controlling machine forming a part of the electronic flaw-detecting device of the present invention, as adapted for handling tapered workpieces.

Hitherto, the inspection of metallic workpieces, such as rollers for roller bearings, has been slow, laborious, and frequently unsatisfactory because of minute flaws evading detection and later causing failure of the roller. Flaws, such as minute cracks of microscopic width, often evade even a careful inspection consistent with practical manufacturing procedure, and taking the time and using the optical magnifying instruments often necessary for locating such minute flaws is impractical from a manufacturing cost and procedure standpoint.

The present invention provides an electronic flaw-detecting device wherein very minute cracks and other flaws in such workpieces are not only detected automatically, but the workpiece possessing such a flaw is also automatically ejected from the procession of workpieces passing through the inspecting device. In the flaw-detecting device of the present invention, the workpieces, such as bearing rollers, are fed to a notched wheel which is rotated intermittently by a so-called Geneva movement, causing the roller to be halted momentarily adjacent a transducer which provides an electromagnetic scanning field and which is connected to a tuned high frequency electronic circuit. The roller, after being permitted to remain motionless for an instant, in order to cause cessation of any bouncing or vibration which it may have acquired as a result of being moved into proximity to the transducer, is then rotated several revolutions while it is adjacent the transducer.

The electronic circuit to which the transducer is connected is so adjusted as to be in a stable condition or in resonance while perfect workpieces are being rotated and scanned adjacent the transducer, but the stability or resonance of the circuit is upset and its tuned condition modified when a flaw, such as a crack, passes the transducer. This condition is amplified so as to actuate a sensitive relay, which in turn operates a deflector such as a gate, which deflects the faulty workpiece into a faulty workpiece receiving chute and away from a good workpiece receiving chute into which it would otherwise fall if without a flaw.

The transducer, shown for purposes of exemplification but not limitation, as a coil of wire through which the high frequency current passes during scanning, sets up an electro-magnetic field during the scanning part of the cycle, and this electro-magnetic field passes through the adjacent surface of the workpiece as the workpiece is rotated to present all portions of its lateral surface to the scanning action of the transducer. In other words, the passage of a crack or similar surface flaw past the transducer disturbs the inductance-capacity relationship or balance by momentarily altering the inductance, thereby changing the frequency of oscillation of the circuit, which change is amplified and subjected to the action of an electronic detector to give a signal and actuate the ejection mechanism. The object of rotating the workpiece is to scan its full circumference, thereby increasing the sensitivity of detection of defects by making them pass close to the transducer.

Referring to the drawings generally, the flaw-detecting device, generally designated 20, of the present invention (Figure 14) consists of a work-handling and controlling machine, generally designated 22 (Figures 1 to 9 inclusive), a transducer, such as an analog transducer, generally designated 246, which scans the workpieces for flaws, and an electronic detection and ejection circuit, generally designated 26 (Figure 14) connected to the transducer and actuated by its response to either pass a perfect workpiece or reject a faulty workpiece possessing a flaw.

*Work handling and controlling machine*

Referring to the drawings in detail, Figures 1 to 9 inclusive show the work handling and controlling machine 22 as mounted upon a base 30 which is supported in any suitable manner, such as by legs or on a bench (not shown). Mounted on the base 30 in an intermediate position thereon is a power input and speed reduction unit, generally designated 32. This consists of a housing 34, the base of which is secured as at 36 to the machine base 30 and which has aligned bearings 38 and 39 therein (Figure 6) in which a power input shaft 40 is journaled for rotation. Mounted on the power input shaft 40 and secured thereto as at 42 is a slipping clutch pulley, generally designated 44, which normally transmits power to the shaft 40, but which in the event of a stoppage caused by a clogging of the machine, permits the harmless rotation of the pulley 44 without consequent rotation of the shaft 40.

The pulley 44 consists of a hub 46 bored to receive the shaft 40 and having an annular disc-shaped flange 48 and a shaft portion 50 projecting laterally therefrom. Engageable with the disc flange 48 is the adjacent face 52 of a grooved pulley 54, the opposite face 56 of which is frictionally engaged by a centrally-bored friction disc 58. The disc 58 is yieldingly and frictionally urged into contact with the pulley 54 and the pulley 54 yieldingly and frictionally urged into engagement with the disc-shaped flange 48 by a helical compression spring 60 encircling the shaft portion 50 and held in position by lock nuts 62 threaded upon the threaded portion 64 of the shaft portion 50.

Keyed or otherwise drivingly secured as at 66 to the power input shaft 40 (Figure 6) is a worm 68 which meshes with a worm wheel 70 keyed or otherwise drivingly secured as at 72 to a power output shaft 74 journaled in the journal bearings 76. One end of the power output shaft 74 carries a flanged elongated hub 78 (Figure 1) which is suitably bored to receive it, and the hub 78 in turn carries three switch-actuating cams 80, 82 and 84 respectively secured in position by set screws 86. The cams 80, 82 and 84 are annularly rabbeted as at 88 to receive cam rings 90 secured thereto by the fasteners 92 operating in arcuate slots 94 (Figure 3) for adjustment purposes. Each cam ring 90 has a high portion 93 and a low portion 95 of arcuate contour separated from one another by transition portions or inclined shoulders 96 and 98 respectively.

For purposes of identification, the cam 80 is designated as the operating switch cam, the cam 82 as the recycling switch cam, and the cam 84 as the holding switch cam, these cams serving to actuate operating, recycling and holding switches 100, 102 and 104 respectively. The switches 100, 102 and 104 are bolted or otherwise secured to an angle bracket 106 (Figure 3) which in turn is bolted or otherwise secured to the base 30. Each switch 100, 102 or 104 is of a conventional pattern and has a spring arm 108 secured thereto at one end (Figures 2 and 3) which at its free end carries a cam follower roller 112 (Figures 1, 2 and 3) rotatably mounted upon an axle 114 supported by ears 116 on the arm 108. The arm 108 actuates the switch plunger 118 which enters the switch casing 110 and engages the contact mechanism, as is well-known to electrical engineers. The detailed construction of the switches 100, 102 and 104 is outside the scope of the present invention. The switch 100, designated the operating switch, is of a normally open type, the switch 102, designated the recycling switch, is a normally closed type, and the switch 104, designated the holding switch, is a normally open type. The connections of these switches to the electronic circuit 26 are described subsequently below.

Figures 5, 6, 7:
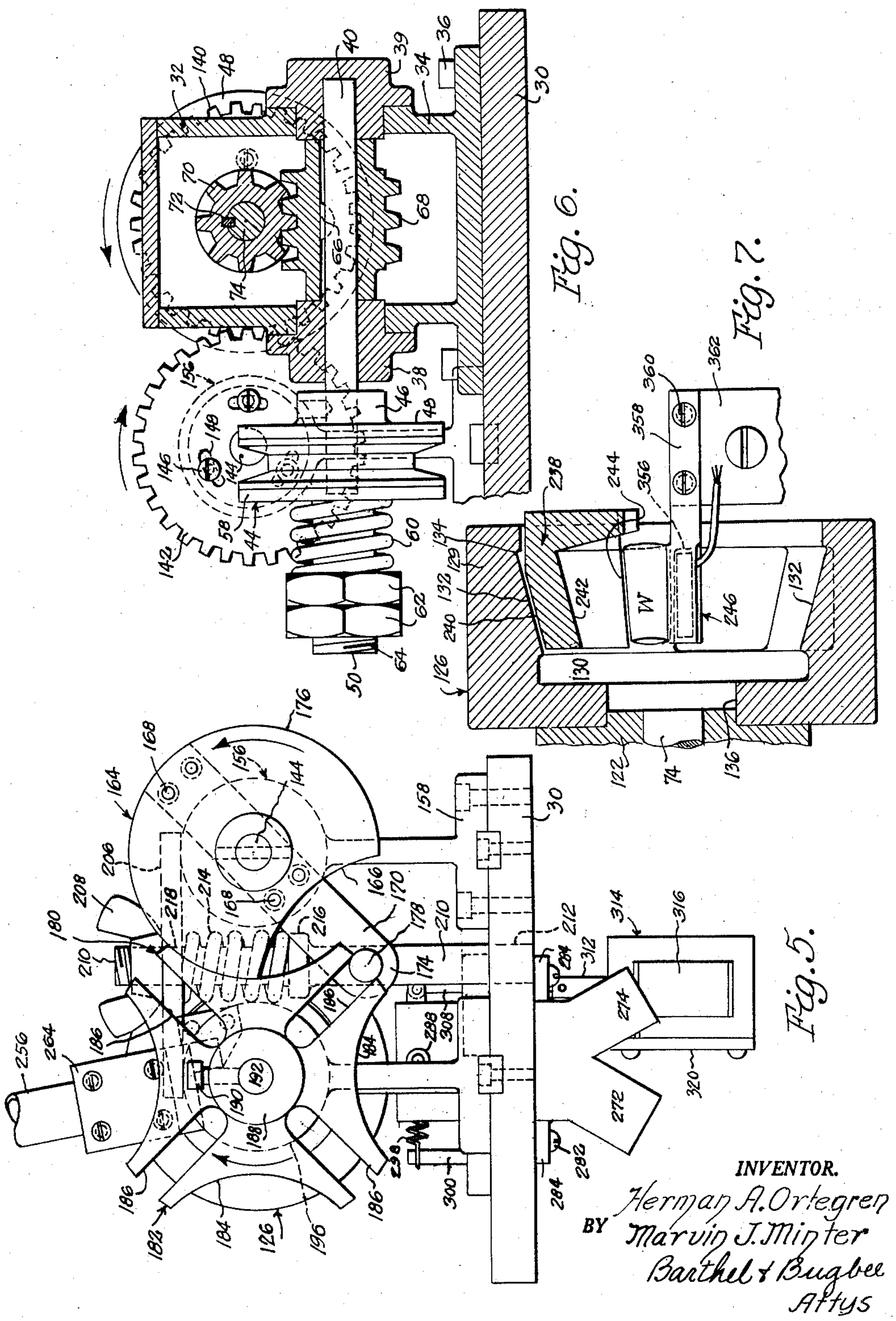
Figure 5 is a right-hand end elevation of the machine shown in Figures 1 to 3 inclusive.
Figure 6 is a vertical cross-section taken along the line 6—6 in Figure 2.
Figure 7 is a fragmentary generally horizontal section taken along the zigzag line 7—7 in Figure 9.

Keyed as at 120 to the opposite end of the output shaft 74 of the power input and speed reduction unit 32 is a flanged hub 122 (Figure 2) which is annularly rabbeted or cut away as at 124 to receive the rearward end 125 of an annular work driving wheel, generally designated 126. The rearward end 125 of the annular work driving wheel 126 is secured in any suitable way to the flanged hub 122, as by the fasteners 128, and its peripheral portion 129 has a central chamber 130 bounded in part by an internal conical work driving surface 132 which terminates in an annular work-retaining shoulder 134 near the outer edge of the wheel 126. The wheel 126 has a central opening 136 adjacent the central chamber 130 and a sector-shaped gap or opening 137 in its peripheral portion 129. Also mounted on the flanged hub 122 and secured to its flange by the fasteners 138 (Figure 1) is a gear 140 which meshes with a similar gear 142 (Figure 1) mounted on a flanged driving shaft 144 and adjustably secured thereto by the fasteners 146 in arcuate slots 148 (Figure 6). The countershaft 144 is journaled in spaced anti-friction bearings 150 near its opposite ends, these in turn being mounted in annular recesses 152 in the opposite ends of a bore 154 passing lengthwise through a head or shaft mounting 156, the base of which is secured as at 158 to the main base 30 (Figure 5).

Secured as by the pin 160 to the opposite end of the countershaft 144 from the gear 142 is the hub 162 of a driving disc 164, the edge portion of which is cut away as at 166 (Figure 5) to provide an arcuate notch extending approximately one-fourth of the circumference thereof. Secured as at 168 to the face of the driving disc 164 on the opposite side thereof from the hub 162 is a diametral arm 170 which is bored as at 172 for the passage of the countershaft 144 (Figure 1) and on its outer end 174, which projects beyond the periphery 176 of the disc 164, is mounted a pin 178. The driving disc 164 and arm 170 form a part of a so-called Geneva movement, generally designated 180 (Figure 5), the remaining part of which consists of a star wheel 182 having arcuate peripheral notches 184 configured to receive the circular periphery 176 of the driving disc 164 and having radial slots 186 disposed between the adjacent notches 184. Since the notches 184 are four in number, although a greater or lesser number might be used, there are also four radial slots 186, these slots slidably receiving and engaging the pin 178 as the driving disc 164 and arm 170 rotate on the countershaft 144. The star wheel 182 has a hub 188 which carries a set screw 190 by which the star wheel 182 is drivingly secured to the rearward end of a driven shaft 192.

The driven shaft 192 is journalled in spaced anti-friction bearings 194 (Figure 2) in a head 196 similar to the head 156, the base of which rests upon the main base 30. The anti-friction bearings 194 are mounted in annular recesses 198 in a bore 200 passing through the head 196 and are held in place by annular centrally-bored caps 202 and 204 respectively (Figure 2). The head 196 is clamped to the main base 30 by a clamping or holddown bar 206, one end of which rests upon the head 156 (Figures 1 and 5) and the opposite end of which rests upon the head 196. Clamping pressure is exerted upon the clamping bar 206 by a wing nut 208 threaded upon the threaded upper end of a stud 210, the lower end of which is seated in a bore 212 in the main base 30 between the heads 156 and 196. The lower end of a compression coil spring 214 engages a flange 216 on the stud 210 and its upper end engages the underside of the bar 206 which has a hole 218 therein through which the stud 210 loosely and slidably passes.

The forward end of the driven shaft 192 projects into the central chamber 130 of the annular work driving wheel 126 and its tapered at that location, as at 220 (Figure 2) to receive a peripherally-notched work-advancing disc 222 (Figure 8) keyed or otherwise secured thereto as at 224 and centrally bored as at 226 with a taper corresponding to the tapered end 220 of the driven shaft 192. A retaining washer 228 secured as at 230 holds the work-advancing disc 222 on the tapered portion 220 of the driven shaft 192 and also acts as a stop for workpieces being loaded and as a guide for workpieces being transferred to the two subsequent positions. The disc 222 is provided at circumferentially-spaced intervals around its periphery 232 with notches 234 corresponding in number and position to the Geneva movement star wheel slots 186 and configured to receive the workpieces W which in this instance are shown as tapered bearing rollers. In order to rotate both ends of these rollers at the same circumferential surface speeds and thus avoid skidding thereof, the apex of the conical surface 132 of the driving wheel 126 is made to coincide with the apex of the conical surface of its roller W, as indicated by the dotted line in Figure 2.

Figures 8, 9:
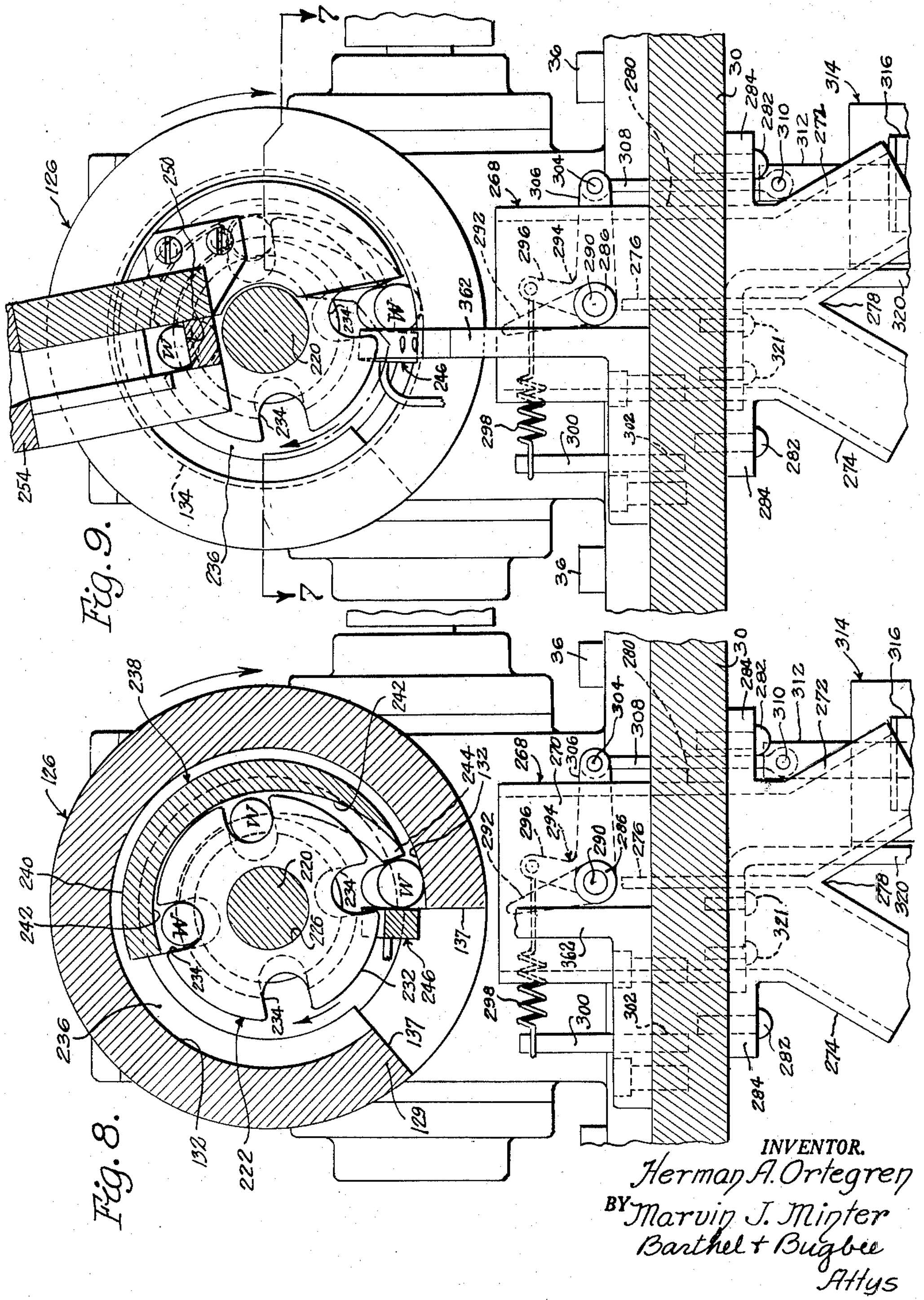
Figure 8 is a generally vertical section taken along the zigzag line 8—8 in Figure 2.
Figure 9 is a generally vertical section taken along the zigzag line 9—9 in Figure 2.

The periphery 232 of the notched work-advancing disc 222 is separated from the internal surface 132 of the annular work driving wheel 126 by an annular space 236 (Figures 8 and 9). A portion of the annular space 236, slightly less than 180° in circumferential extent, is occupied by an arcuate work guide 238 of arcuate segmental shape. The outer arcuate surface 240 of the work guide 238 is substantially coaxial with the internal surface 132 of the work driving wheel 126 and is provided with a corresponding conical surface of shorter radius of curvature in a given radial plane. The inner arcuate surface 242 of the work guide 238, while also conical and closely approaching the conical-surfaced periphery 232 of the notched work-advancing disc 22, is not coaxial therewith (Figure 8) but is eccentric thereto, falling away from the periphery 232 at the lower end 244. This construction enables a workpiece W, when dropped into a notch 234 uppermost in the work-advancing disc 222, to gradually roll out of that notch 234 as the notch 234 approaches the lowermost position, until the workpiece drops off the lower end 244 into direct contact with the inner peripheral driving surface 132 of the work driving wheel 126.

Located at this lowermost point, slightly in advance of the lower end 244 of the work guide 238 is a transducer, generally designated 246, which serves both as a stop for the workpiece W and as a scanning device for detecting flaws therein, as explained in more detail below. The transducer 246 is separated from the lower end 244 of the arcuate work guide 238 by an interval slightly greater than the diameter of a workpiece W so as to enable the latter to rotate freely around its own axis when so driven by the rotation of the work driving wheel 126.

The workpieces W are fed to the notches 234 in the work-advancing disc 222 by a work feeding chute 248 having an arcuate passageway 250 therein (Figure 2) with its outlet at its lower end adjacent the positions passed by the notches 234, and with its inlet at its upper end communicating with an opening 252 in a plate 254 in which the workpiece feeding tube 256 is seated, the opening 252 being enlarged as at 258 to receive the lower end of the feeding tube 256. The chute 248 and the plate 254 are secured by the fasteners 260 and 262 respectively to the upright portion of an angle bracket 264, the horizontal portion of which is secured by the screws 266 to the head 196.

Disposed below the work driving wheel 126 is a workpiece discharge chute 268 which receives the workpieces W falling through the sector-shaped gap or discharge opening 137 in the workpiece driving wheel 126 (Figure 8). The chute 268 has an upper portion 270 and two divergent branches 272 and 274 of about half the width of the upper portion 270, with a vertical partition wall 276 rising from their junction 278 (Figure 8). The upper portion 270 of the chute 268 passes through a hole 280 in the main base 30 (Figure 2) and is secured thereto by the fasteners 282 extending upward through the flanges or lugs 284 into the underside of the main base 30.

The upper portion 270 of the chute 268 is provided on its opposite walls with bearing bosses 286 and 288 (Figure 2) in which a gate shaft 290 is oscillatably mounted. The gate shaft 290 within the upper portion 270 of the chute 268 is provided with a gate 292 which swings to and fro across the upper portion 270 so as to deflect workpieces either into the branch chute 274 or into the branch chute 272. Mounted on the outer end of the gate shaft 290 is a bell crank lever 294, to the upper arm 296 of which is connected one end of a tension spring 298, the opposite end of which is anchored to a post 300 secured in the bore 302 in the main base 30 (Figure 8). Pivotally connected as at 304 to the lower arm 306 of the bell crank lever 294 is a link or connecting rod 308, the lower end of which is pivotally connected as at 310 to the reciprocating armature 312 of an electro-magnetic solenoid 314 having a working coil or winding 316. The solenoid 314 is secured as by the fasteners 318 to an angle bracket 320 (Figure 2) secured as at 321 (Figure 8) to the underside of the main base 30.

*Modified work handling machine for straight workpieces*

The modified work handling machine, generally designated 322 (Figure 16), is generally similar to the work handling and controlling machine 22 shown in Figures 1 to 13 inclusive, except that it is constructed and arranged to handle workpieces V consisting of straight rollers rather than the tapered workpieces W handled by the machine 22 of Figures 1 to 13 inclusive. The corresponding parts of the work handling machine 322 of Figure 16, insofar as they are the same as the parts shown in the upper central portion of Figure 2, are designated by the same reference numerals.

In the machine 322, the output shaft 74 carries the hub 324 keyed or otherwise drivingly secured thereto and carrying an internal driving wheel 326 having an annular cylindrical internal driving surface 328. Projecting into the chamber 330 within the driving wheel 326 is the reduced diameter end 332 of a driven shaft 334 similar to the driven shaft 192 of Figure 2 and similarly supported in anti-friction bearings (not shown) mounted in the head 196 of the same construction. The reduced diameter portion 332 has a peripherally-notched work-advancing disc or drum 336 mounted thereon and held in position by a disc or washer 338 and screw or other fastener 340 threaded into the suitably bored and threaded hole 342 in the end of the reduced diameter portion 332 of the driven shaft 334. The peripheral notches 344 in the work-advancing disc or drum 336 have their axes parallel to the axis of the shaft 334 rather than inclined toward it as in the case of the notches 234 in the disc 222 of Figures 1 to 13 inclusive. An arcuate segmental workpiece guide 346 is mounted in the annular space between the outer surface 348 of the notched drum 336 and the inner surface 328 of the work driving wheel 326, its outer and inner surfaces 350 and 352 respectively being cylindrical instead of conical, but similarly disposed on centers which are eccentric to one another, as in the case of the outer and inner surfaces 240 and 242 of the work guide 238 (Figure 8). The outer and inner surfaces 350 and 352 converge to a common edge (not shown) as in the work guide 238 of Figure 8), so as to permit the workpieces V to gradually drop out of the notches 344 as the disc or drum 336 rotates and the notch 344 approaches the transducer 246 at the bottom, in the space between the surfaces 328 and 348.

Figures 10, 11, 12, 13, 16, 17:
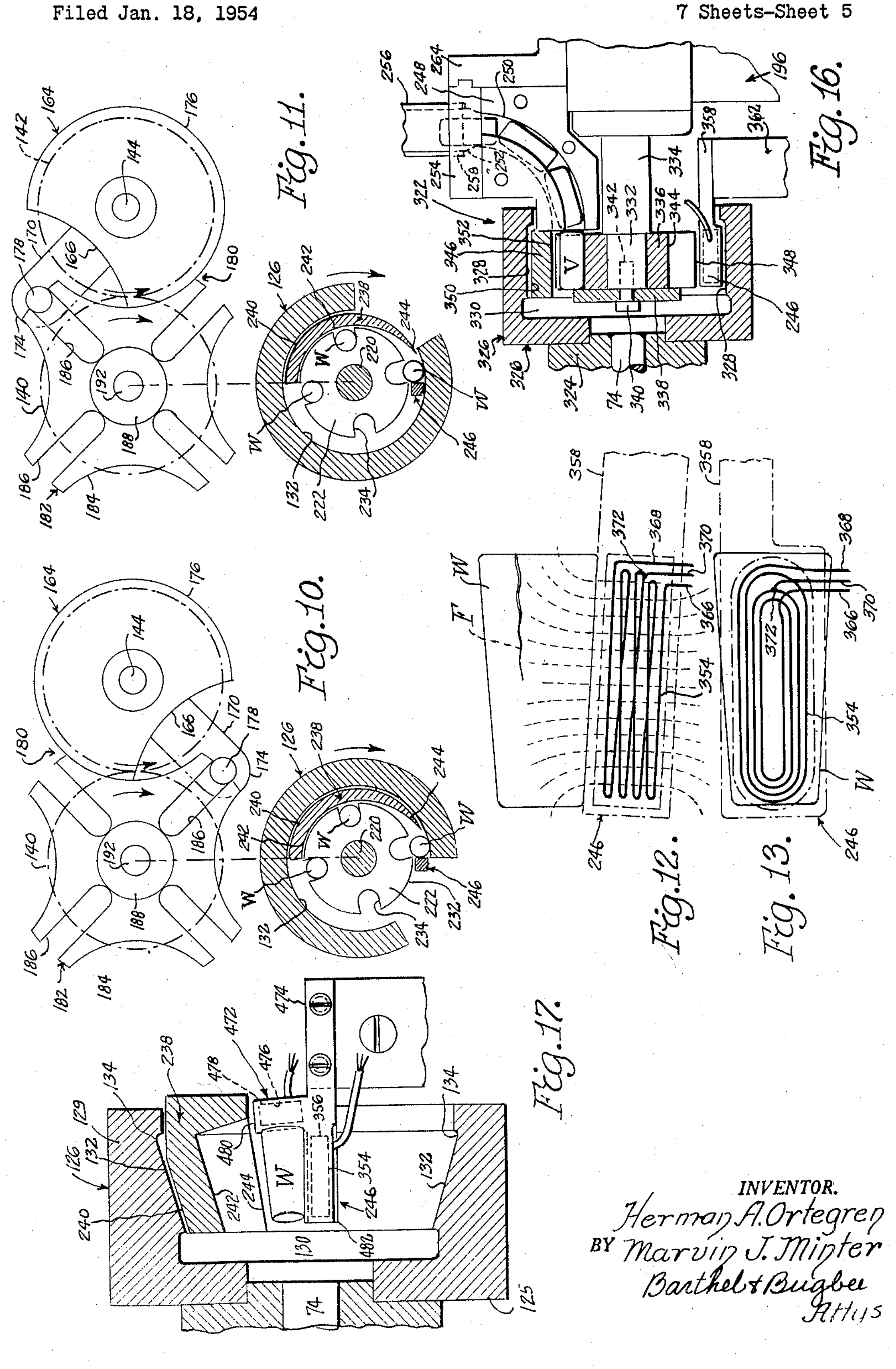
Figure 10 is a diagrammatic end elevation and cross-section combining the views in the two planes of Figures 5 and 8, showing the relative positions of the operating parts at the commencement of a work-inspecting cycle.
Figure 11 is a diagrammatic view similar to Figure 10, but showing the relative positions of the operating parts at the conclusion of a work inspecting cycle.
Figure 12 is an enlarged fragmentary diagrammatic top plan view of a workpiece being scanned by the electromagnetic field of the transducer of the flaw-detecting device of the present invention.
Figure 13 is a diagrammatic front elevation of the parts shown in Figure 12.
Figure 16 is a fragmentary side elevation, partly in vertical section, of a modification of the upper central portion of the machine shown in Figure 2, adapted for handling workpieces consisting of straight-sided workpieces.
Figure 17 is a fragmentary horizontal section of a modification of Figure 7, wherein the single transducer is replaced by two transducers for scanning the sides and one end surface of the workpiece for flaws.

The workpieces V are fed downwardly into the notches 344 by an arcuate passageway 250 in a chute 248 similar to that described above, similarly counterbored to receive the workpiece feeding tube 256, and similarly mounted upon an angle bracket 264. The operation of the modified machine 322 shown in Figure 16 is similar to that described below for the machine 22, and employs a similar electronic circuit, as also described below.

*(Electronic flaw-detecting and ejection circuit)*

Figures 14, 15:
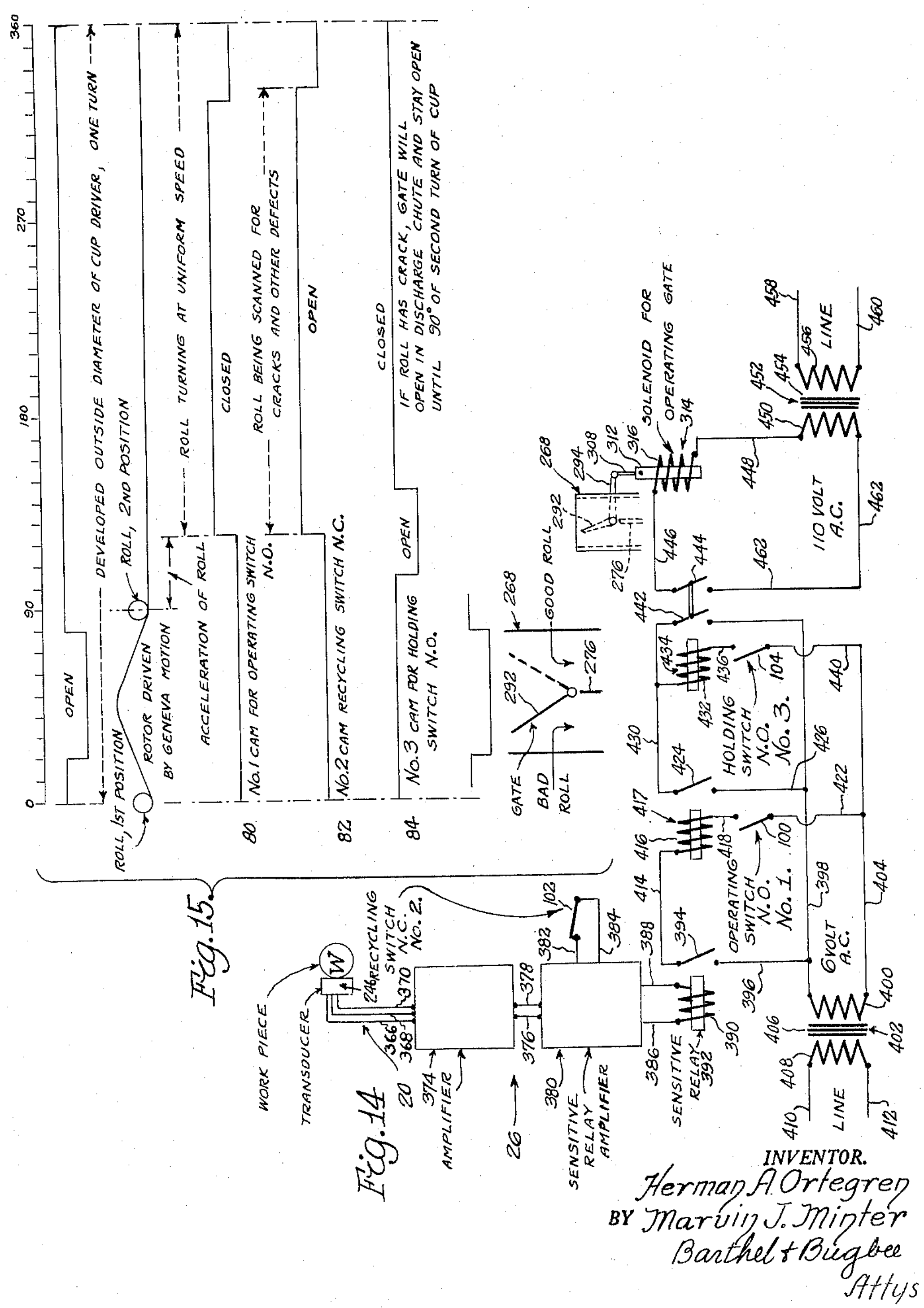
Figure 14 is a diagrammatic view of the electronic circuit of the flaw-detecting device, employing a single transducer.
Figure 15 is a diagrammatic view showing the relative positions of the operating parts and switch-actuating cams of the work handling and controlling machine during a 360° operating cycle of the flaw detecting device of the invention.

The electronic detection and ejection circuit, generally designated 26, shown in Figure 14, is connected electrically to the transducer 246 mentioned above. The transducer 246 consists of an elongated coil 354 of wire mounted in a similarly-shaped cavity 356 (Figure 7) in an arm 358 of non-metallic material secured as at 360 to an upstanding bracket 362 secured as at 364 to the main base 30. The transducer coil or winding 354 has two lead wires 366 and 368 connected to its opposite ends and a third lead wire 370 connected to a tap 372 intermediate the opposite ends of the coil 354 (Figures 12 and 13). In order to avoid interference with or diversion of the magnetic field created by the energization of the transducer coil 354, the workpiece driving wheel 126, the arm 358 and the notched work carrying disc or drum 222 are all preferably made from non-metallic material, that material well-known by the trade-name "nylon" being preferred because of its toughness, durability and consequent long life.

From the transducer 246, the lead wires 366, 368 and 370 run to the electronic circuit 26 which, in the present invention, is a conventional tuned high frequency circuit for causing high frequency alternating current to flow through the coil 354 of the transducer 246. When a perfect workpiece W is rotated adjacent the transducer 246, the balance or electrical resonance of this electronic circuit 26 remains undisturbed. When, however, a flaw F (Figure 12), such as a crack, moves past the coil 354 of the transducer 246, it causes the high frequency alternating current to undergo two changes, one in amplitude and the other in frequency. The present inventors have employed two different electronic circuits 26 to take advantage of these changes to detect and eject faulty workpieces.

The first circuit which has been successfully employed in the present invention, operates on the principle of a change in amplitude, and consists of a conventional radio-frequency amplitude-modulated amplifier circuit having a radio-frequency amplifier 374 including a conventional detector (not shown) and connected to an audio-frequency amplifier 380, also referred to herein as a sensitive relay amplifier. This first circuit has been successfully operated at a frequency of 450 kilocycles, but a wide range of frequencies may be used. In general, the lower the frequency employed, the deeper is the penetration into the workpiece W.

The second electronic circuit 26 which has also been successfully employed in the present invention is a conventional frequency-modulation amplifier circuit employing the well-known Armstrong frequency-modulation circuit, such as has been widely used in frequency-modulation radio apparatus. This frequency modulation circuit makes use of the change in frequency which also occurs when a flaw in the workpiece W passes the transducer coil 354 (Figure 12), and has employed a frequency of 1.4 megacycles. Here, again, a wide variation in frequency is possible and a frequency as high as 2.8 megacycles may also be employed. Both the first circuit, or radio-frequency amplitude-modulated amplifier, and the second circuit, or frequency modulation amplifier, are well-known to electronic engineers and are of conventional designs available upon the open market. These circuits are conventional and their details are beyond the scope of the present invention.

In either circuit 26, the change in the amplitude or frequency brought about by the passing of the flaw F, such as a crack, through the magnetic field set up around the transducer coil 354 by the high frequency current flowing through it, produces a change in the amplitude or in the frequency of the oscillator, as the case may be, depending upon which of the two above circuits is employed. This change is amplified and detected to give a signal or pulsation, the amplified change being used to actuate a sensitive relay 392 subsequently described below. This in turn actuates certain magnetic switches and a solenoid to shift the gate 292 to deflect the faulty workpiece into a separate receiver from the perfect workpieces, as explained below in connection with the operation of the invention.

From the amplifier 374, the wires 376 and 378 lead to the sensitive relay amplifier, generally designated 380. From the sensitive relay amplifier 380, the wires 382 and 384 (Figure 14) lead to the opposite contacts of the cam-operated recycling switch 102, which is normally closed. Also from the sensitive relay amplifier 380, the wires 386 and 388 lead to the opposite ends of an operating coil or winding 390 of a conventional sensitive relay 392 having a switch blade or bar 394 operated thereby to close in response to energization of the winding 390. From one contact of the sensitive relay switch blade 394, the wire 396 leads to one output wire 398 connected to the secondary winding 400 of a conventional stepdown transformer 402, having an additional output line 404. The stepdown transformer 402 has the usual core 406 and a primary winding 408 connected to the conductors 410 and 412 of the usual power circuit of any desired or available voltage, such as a 220 or 440 volt alternating current power line.

From the remaining contact of the sensitive relay switch blade 394, the line 414 (Figure 14) runs to the winding or operating coil 416 of the magnetic switch 417. From the opposite end of the coil 416 a line 418 runs to one terminal of the cam-operated normally-open switch 100 from which the line 422 runs to the output line 404 from the secondary winding 400 of the stepdown transformer 402. The magnetic switch 417 is provided with and when energized closes a normally-open switch blade or contactor bar 424, one terminal of which is connected by the line 426 to the stepdown transformer output line 398, whereas the other terminal is connected by the line 430 to one end of the operating coil 432 of the magnetic switch 434 from the opposite end of which a line 436 runs to one terminal of the cam-operated normally-open switch 104. From the remaining terminal of the cam-operated switch 104, the line 440 runs to the output line 404 from the secondary 400 of the stepdown transformer 402, completing the circuit.

The magnetic switch 434 is provided with a normally-open holding switch blade or contactor bar 442 (Figure 14) to one terminal of which the line 430 is connected and to the opposite terminal of which the output line 398 from the secondary winding 400 of the stepdown transformer 402 is connected. Also actuated by the operating coil 432 of the magnetic switch 434 is a gate control switch blade 444 from one terminal of which the line 446 runs to the operating coil 316 of the solenoid 314, from the remaining terminal of which the line 448 runs to the secondary winding 450 of a stepdown transformer 452 having the usual core 454 and primary winding 456 served by the power lines 458 and 460. From the remaining terminal of the transformer secondary winding 450, the line 462 runs to the remaining terminal of the solenoid controlling switch blade 444 of the magnetic switch 434. As in the case of the stepdown transformer 402, the input power lines 458 and 460 may comprise alternating power current of any desired voltage, such as 220 or 440 volts. The current coming off the secondary winding 400 of the transformer 402 through the wires 398 and 404, however, is preferably of a relatively low voltage such as from 6 to 20 volts, in order to keep the voltage low in the control circuit. The current coming off the secondary winding 450 of the stepdown transformer 452, on the other hand, is preferably of a higher voltage, such as 110 volts, in order to provide adequate power for actuating the solenoid armature 312 and link 308 to shift the bellcrank lever 294 and the gate 292 in the workpiece discharge chute 268 above the partition 276.

*Operation*

In the operation of the form of the invention shown in Figures 1 to 13 inclusive, connected up in the electric circuit shown in Figure 14, let it be assumed that a supply of workpieces W to be tested has been fed to the feed tube 256 (Figure 2) with their small ends directed downward. Mechanical devices for automatically so positioning tapered workpieces have been previously inverted, are known to those skilled in the anti-friction bearing art, and form no part of the present invention. Let it also be assumed for the present that only the tapered or side surface of each workpiece W is to be checked for flaws by the device.

The electronic circuit 26 (Figure 14) is so adjusted as to deliver high frequency alternating current to the transducer 246, and the circuit is adjusted so as to be in a balanced condition or in resonance when a perfect or flawless workpiece W is presented to the transducer 246 for scanning. The work-handling and controlling machine 22 is then started in operation by applying power to the friction or slipping pulley 44, thereby rotating the output shaft 74 of the power input and speed reduction unit 32. This action causes the cams 80, 82 and 84 to rotate and also causes the simultaneous rotation of the work driving wheel 126 and the gear 140. The latter in turn rotates the gear 142 at the same speed, from its having the same number of teeth, and consequently rotates the countershaft 144, disc 164 and arm 170 of the Geneva movement 180. The continuous rotation of the disc 164 and arm 170 causes intermittent rotation of the star wheel 182, with the result that the driven shaft 192 rotates intermittently a quarter revolution at a time, halting between each quarter turn, due to the engagement of the pin 178 on the arm 170 with each of the four radial slots 186.

This intermittent rotation of the driven shaft 192 causes a corresponding intermittent rotation of the peripherally-notched work-advancing disc or drum 222, with the result that a roller or other workpiece W which has been fed into the uppermost notch 234 (Figure 8) from the arcuate passageway 250 is carried around a quarter revolution at a time, and, guided by the eccentric inner surface 242 of the segmental work guide 238, gradually falls away from and out of its notch 234 until, after a couple of revolutions of the countershaft 144 and arm 170, it arrives in its lowermost position (Figure 8) completely out of its notch 234 and resting against the transducer 246.

Figure 15 shows graphically what happens during the operating cycle during a quarter turn of the notched wheel 222 from the first position of the workpiece W corresponding to the middle or horizontal position in Figures 8, 10 and 11, to the second or bottom position resting against the transducer 246, also shown in these views. Commencing with the roller or workpiece W in the so-called first position, directly opposite the arrowhead of the lead arrow of the reference numeral 238 in Figure 10, the Geneva motion moves the notched wheel 222 through a 90° interval until the roller or other workpiece W arrives at its second or bottom position of Figure 10, indicated by a travel of 90° on the scale at the top of Figure 15 and also indicated by the rising and falling curve between the captions "Roll, 1st position" and "Roll, 2nd position." The degree scale at the top of Figure 15 corresponds to various positions in one 360° turn of the developed outside diameter or circumference of the cup-driver or work driving wheel 126.

Figures 2, 3, 4:
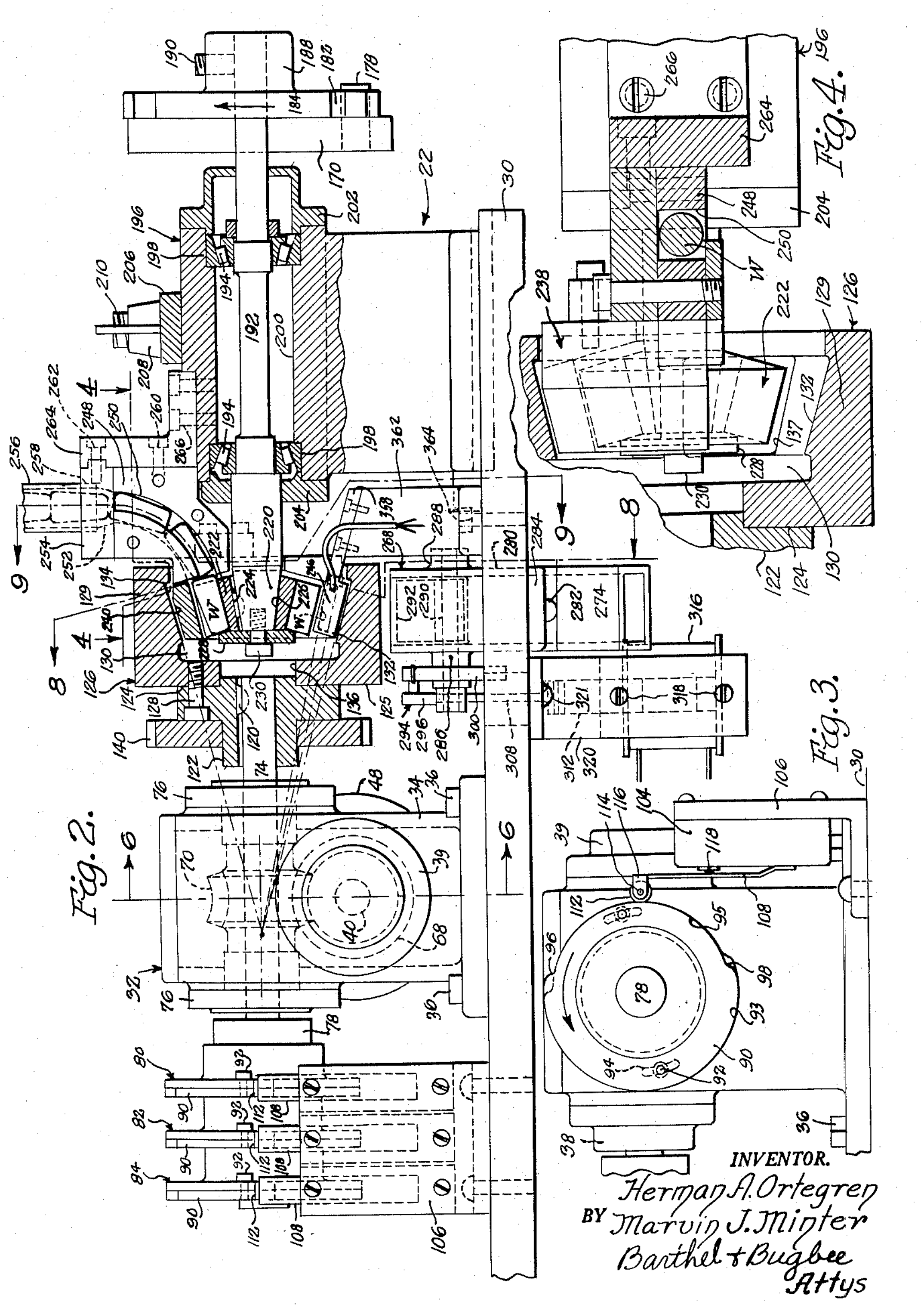
Figure 2 is a side elevation, partly in vertical section, of the machine shown in Figure 1.
Figure 3 is a left-hand elevation of the machine shown in Figures 1 and 2.
Figure 4 is a fragmentary horizontal section taken along the zigzag line 4—4 in Figure 2.

While the workpiece is being transferred from the first position to the second position by the rotation of the notched disc 222, the workpiece driving wheel 126 has made one turn, due to the similarly-toothed gears 140 and 142 (Figure 1). As the roller or other workpiece W is being deposited on the driving wheel 126 at the second or bottom position at the transducer 246, it is at a standstill and also has no turning action, hence a certain amount of rotation of the driving wheel 126 is required thereafter, to accelerate the turning of the workpiece W before any attempt is made to inspect the workpiece. Hence the roller or other workpiece W for an interval of about 35° rotation of the driving wheel 126 starts to rotate and until it rotates at a uniform speed, as indicated by the approximately 35° interval on Figure 15 designated by the caption "Acceleration of Roll," the electronic circuit is dormant. This period of approximately 35° rotation of the work driving wheel 126 while the roll is being accelerated, corresponds to the "settling down" period of the workpiece referred to above. If this "settling down" period is not provided, and the roll bounces after the electronic circuit is energized, it moves up and down in the magnetic field of the transducer 246 and is consequently likely to give a false response from the circuit 26, thereby possibly causing a perfect workpiece to be rejected and ejected as a faulty workpiece.

When the driving wheel 126 has completed its approximately 35° rotation through the workpiece acceleration period, the high point or shoulder of the operating switch cam 80 (Figure 1) arrives at the switch operating roller 112 on the arm 108 of the normally-open operating switch 100, closing it upon its contacts. At the same time (Figure 15), the low point or shoulder of the cam 82 has arrived opposite the operating roller 112 of the normally-closed re-cycling switch 102, permitting it to close upon its contacts.

Meanwhile, during almost the entire period of revolution of the work driving wheel 126, the normally open holding switch 104 has been held closely by the suitably configured periphery of the cam 84, which releases its operating roller 112 and arm 108 only for the short period beginning about halfway through the workpiece acceleration period as seen from the lowermost diagram beside the reference numeral 84 in Figure 15, to approximately the same time lag beyond the instant of actuation of the operating and re-cycling switches 100 and 102 at the end of the workpiece or roll acceleration period. In other words, if the roller or workpiece acceleration period extends from 90° to 125° of the operating cycle (Figure 15), the normally-open holding switch 104 is permitted by its cam 84 to remain open from approximately 105° to approximately 145° of the operating cycle. The workpiece, such as the roller W, is now being rotated at a uniform speed by the driving wheel 126 against the transducer 246, which acts as a stop.

The closing of the normally-open operating switch 100 and the simultaneous opening of the normally-closed recycling switch 102 allows the output from the transducer 246 to go through the amplifier 374 to the trigger circuit of the amplifier 380 and thence through the operating coil 390 of the sensitive relay 392. Assuming that the circuit has been adjusted for proper balance or electrical resonance condition during the passage of a perfect workpiece W, the rotation of the workpiece W by the driving wheel 126 in this magnetic field creates no disturbance. As a consequence, when the opening 137 in the driving wheel 126 arrives beneath the workpiece W resting against the transducer 246, an instant later than the position shown in Figure 11, the perfect workpiece W drops downward into the mouth of the discharge chute 268 and is deflected by the gate 292 (Figure 9) into the chute 272 leading to a receptacle for perfect workpieces.

While this has been going on, the recycling switch 102 has remained open at the same time as the operating switch has been closed, but for a slightly longer period to prevent the creation of any disturbances resulting from its operation from accidentally operating the solenoid 314 and the gate 292 in the discharge chute 268. The holding switch 104, on the other hand, is closed shortly after the operating and recycling switches, in order to prevent its being affected by any disturbance from the operating and recycling switches 100 and 102. The holding switch 104, however, is opened later enough to permit the workpiece W to fall past the gate 292 without interference.

Furthermore, the roller or other workpiece W in its second or bottom position against the transducer 246 (Figures 8, 10 and 11) is slightly to one side of being directly below the center or axis of the shaft 220, so that in effect it is rolling downhill by gravity along the inner surface 132 of the driving wheel 126 (Figure 8) against the transducer. This action, aided by the driving force of the driving wheel 126 against the workpiece W, maintains the workpiece W against the transducer 246 without setting up undue pressure, prevents fluttering of the workpiece, and eliminates excessive wear on the transducer 246. This off-center arrangement of the workpiece W also enhances the driving action of the driving wheel 126 and consequently prevents excessive slippage. During the scanning period by the transducer 246, the roller or other workpiece K is rotated about three revolutions upon its axis, thereby giving a thorough scanning of its surface by the electromagnetic and electrostatic field of the transducer 246. This is true, whether the workpiece is tapered as in Figures 1 to 11 inclusive, or straight as in Figure 16.

If the workpiece W possesses a flaw, as indicated by the crack F in Figure 12, the travel of this flaw past the transducer 246 alters the balance or resonance of the tuned electronic circuit 26 and changes both the frequency and amplitude of the high frequency current flowing through the transducer coil 354. This disturbance or pulsation is transmitted through and amplified by the amplifier 374 (Figure 14), rectified by its detector, and further amplified by the sensitive relay amplifier 380. The resulting amplified pulsation sufficiently energizes the operating coil 390 of the sensitive relay 392 to close its switch blade 394 upon its contacts, consequently energizing the operating coil 416 of the magnetic switch 417 through the line 396, the now-closed relay switch 394, the lines 414 and 418, the now-closed operating switch 100, and the line 422 from the output lines 398 and 404 of the secondary winding 400 of the step-down transformer 402.

The energization of the magnetic switch 417 and the consequent closing of its switch blade or contactor 424 upon its contacts energizes the operating coil 432 of the magnetic switch 434 from the output line 398 of the step-down transformer 402 through the line 426, the now-closed magnetic switch blade 424, the line 430, the line 436, the now-closed holding switch 104 and the line 440 leading to the output line 404 of the step-down transformer 402.

The energization of the operating coil 432 of the magnetic switch 434 simultaneously closes both of its switch blades 442 and 444, the former establishing a temporary holding circuit for bridging the magnetic switch blade 424 temporarily after the magnetic switch 417 opens with the de-energization of the sensitive relay 392 following the passage of the pulsation resulting from the disturbance caused by the passage of the flaw F past the transducer 246. The closing of the second switch blade 444 of the magnetic switch 434, however, energizes the solenoid 314 from the lines 446, 448 and 462 leading from the secondary winding 450 of the stepdown transformer 452. The energization of the solenoid 314 pulls its armature 312 and link 308 downward, shifting the bell crank 294 clockwise and swinging the gate 292 from its position of Figures 8, 9 and 14 and its solid line position of Figure 15 over the left-hand side of the discharge chute 268, to a position over the right-hand side thereof, shown in dotted lines in Figure 15. Consequently, the subsequent dropping of the faulty workpiece W results in its being deflected by the gate 292 into the defective workpiece discharge chute 274 whence it drops into a suitable receiver for defective workpieces (not shown).

With the acceptance or rejection of the workpiece just dropped from the scanning position adjacent the transducer 246, the cam 80 releases the plunger 118 of the operating switch 100, permitting the latter to open. Thus, while the roller is traveling from its first position down to its second position against the transducer, it does not create any disturbance in the magnetic switch 434 nor in the solenoid 314. The re-cycling switch 102 momentarily de-energizes the sensitive relay 392 and thus resets the circuit 26 for a subsequent scanning operation by imparting another pulse to a so-called "flip-flop trigger tube" included in the circuit 26. This "flip-flop trigger tube" is conventional and well-known to those skilled in the electronics art and is applied in circuit 26 as shown in Figures 5–17 on page 165 of the book "Pulse and Digital circuits" by Jacob Millman and Herbert Taub and published in 1956 by McGraw-Hill Book Co. of New York city, in its "Electrical and Electronic Engineering Series." Since the driving wheel 126 and work-positioning disc or roller 222 are both of electrically non-conducting material, such as nylon, fiber or ceramics, these elements leave the electronic circuit 26 unaffected during their motion. If they were of conducting material, they would tend to upset the balance or resonance of the circuit 26 and interfere with its proper operation. The rotation of the workpiece against the transducer 246 increases the sensitivity of scanning and flaw detection by bringing the flaw closer to the transducer 246 than it would otherwise come if the workpiece were not rotated, thereby possibly passing minor flaws in stationary workpieces which would cause the workpiece to be rejected if it were rotated past the transducer 246.

The recycling switch 102 remains open an instant after the operating switch 100 opens, in order to prevent accidental opening of the gate 292 and consequent ejection of a good work-piece by a pulsation otherwise arising from the operation of the recycling switch 102. It will be understood that while the driving wheel 126 rotates one turn, the work-positioning disc or rotor 222 is rotated only one quarter of a turn by the Geneva movement 180. While the lowermost roller or other workpiece is being moved into position against the transducer 246, at the bottom of the notched disc 222, a second roller is moving simultaneously from the topmost notch to the notch at the right-hand side (the so-called "first position" of the workpiece) and upon reaching these positions, a third roll drops into the notch 234 arriving at the topmost position adjacent the mouth of the arcuate passageway 250. Thus, there are always three workpieces in the notched disc 222 at a given time.

The present apparatus is not limited in its action to surface defects but is also capable of detecting internal defects, since these are reached by the magnetic field extending outward from the energized transducer coil 354 (Figure 12). The present apparatus is also capable of detecting variations in the thickness of the case-hardened surface layer of case-hardened workpieces, even though no actual flaw exists in the surface layer and the surface layer remains unbroken. The variation of thickness of the case-hardening layer, as in the case of a flaw, upsets the balance or resonance of the electronic circuit 26, creates and amplifies the pulse which in turn operates the sensitive relay 392 and consequently actuates the workpiece deflecting and ejecting gate 292 from the energization of the solenoid 314.

The operation of the apparatus with the modified work handling machine 322 for straight workpieces (Figure 16), is similar to that described above for tapered workpieces and hence requires no additional description.

Of the two circuits described above as suitable for use in the electronic circuit 26, namely the amplitude modified circuit or the frequency modulation circuit, the latter, employing the higher frequency oscillations, is found to be somewhat more sensitive than the former.

*Modified electronic detection and ejection circuit*

Figure 18:
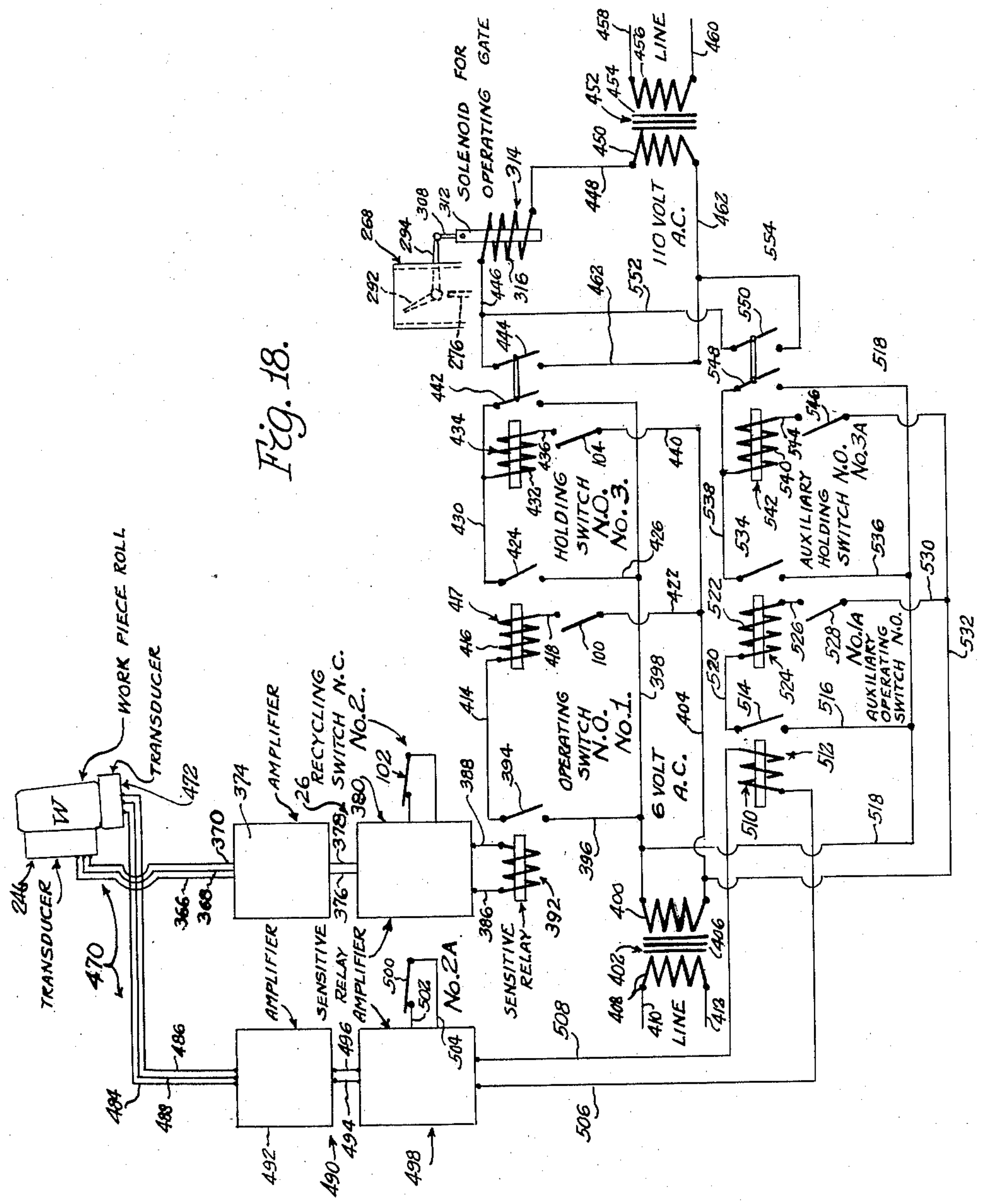
Figure 18 is a diagrammatic view of the electronic circuit of the flaw-detecting device of the present invention, employing the two transducers of Figure 17.

For workpieces V having a single surface to be scanned for defects, such as straight cylindrical rollers, the electronic flaw-detection and ejection circuit 26 shown in Figure 14 is suitable. In the case of workpieces having two separate surfaces to be scanned, such as the tapered rollers W having their surfaces at one end serving as thrust surfaces or additional working surfaces, the modified electronic detection and ejection circuit, generally designated 470 shown in Figure 18, is suitable. This circuit includes an auxiliary transducer 472 (Figure 17) in addition to the previously-mentioned main transducer 246, the two transducers 246 and 472 being mounted upon a T-shaped arm 474 of non-metallic material such as the Nylon previously mentioned above. The main transducer 246 with its scanning coil or winding 354 is connected in the manner shown in the upper left-hand portion of Figure 18, which is substantially identical with the circuit shown in Figure 14 and previously described in connection therewith, hence corresponding parts and lines bear the same reference numerals.

The auxiliary transducer 472, however, consists of a winding or coil 476 (Figure 17) disposed with its axis very nearly at right angles to the axis of the coil 354 of the main transducer 246, depending upon the taper of the particular workpieces W being inspected. The auxiliary transducer coil 476 is similar to but smaller than the main transducer coil 354, is preferably similarly elongated and similarly installed in a cavity 478 in the arm portion 480 which projects at an angle to the arm portion 482 (Figure 17) of the arm 474 in which the main transducer coil 354 is mounted. Thus, the magnetic fields set up by the main and auxiliary transducer coils 354 and 476 cross one another's paths during operation and, if interference of non-negligible extent arises, the transducer coils 354 and 476 are energized alternately so as to prevent such oscillation, this being done, for example, by an additional cam and additional switch on the shaft 74 similar to the cams 80, 82 and 84 and the switches 100, 102 and 104. For simplification, however, the circuit of Figure 18 has been shown as having the main transducer 246 and auxiliary transducer 472 simultaneously energized.

The auxiliary transducer coil or winding 476 also has two lead wires 484, 486 connected to the opposite ends of the coil and a third lead wire 488 connected to an intermediate portion thereof similar to that of the main transducer coil 354. These lead into an auxiliary electronic detection and ejection circuit, generally designated 490, and having an amplifier 492 similar to the amplifier 374 and similarly connected by the wires 494 and 496 to the sensitive relay amplifier 498 having an auxiliary recycling switch 500 having lead wires 502 and 504 leading to the opposite terminals thereof from the sensitive relay amplifier 498. The switch 500 is similar to the main recycling switch 102 and is similarly operated by the cam 82.

From the sensitive relay amplifier 498, the lines 506 and 508 lead to the opposite ends of the operating coil 510 of an auxiliary sensitive relay 512 which, when energized, closes its normally open switch blade 514, one terminal of which is connected by the line 516 to a line 518 leading thereto from the output line 398 of the secondary winding 400 of the stepdown transformer 402 previously described. Leading from the opposite terminal of the switch blade 514 is a line 520 connected to one end of the operating coil 522 of an auxiliary magnetic switch 524, the opposite end thereof being connected by a line 526 to one terminal of the normally-open cam-operated auxiliary operating switch 528 which may be operated by the same cam 80 which operates the cam-operated main operating switch 100 previously mentioned. Alternatively, a separate cam may be used for this purpose.

From the remaining terminal of the auxiliary operating switch 528, a line 530 runs to a line 532 extending back to the output line 404 of the secondary winding 400 of the stepdown transformer 402.

The magnetic switch 524, when energized, closes a switch blade or contactor 534, one terminal of which is connected by a line 536 to the current supply line 518 previously mentioned, the other terminal thereof being connected by the line 538 to the operating coil 540 of an auxiliary magnetic switch 542, the opposite end of which is connected by the line 544 to one terminal of the normally-open cam-operated auxiliary holding switch 546, the opposite terminal of which is connected to the current supply line 532 previously mentioned.

The magnetic switch 542, when energized, closes two normally-open switch blades 548 and 550. The opposite terminals of the switch blade 548 are connected respectively to the lines 538 and 518 previously mentioned, in order to establish a holding circuit for the magnetic switch 542. The opposite terminals of the second switch blade 550 of the magnetic switch 542 are connected to the solenoid energization line 446 and the stepdown transformer secondary output line 462 by the lines 552 and 554 respectively, so that closing of the switch blade 550, like the closing of the switch blade 444 of the contactor switch 434, will energize the operating coil 316 of the solenoid 314 to actuate the workpiece deflecting gate 292 in response to the testing of a workpiece with a defective end surface.

The operation of the modified electronic detection and ejection circuit 470 is similar to that of the electronic circuit 26 insofar as scanning and detecting imperfections on the side surface or side portions of the workpiece W is concerned. This operation has been sufficiently described above and requires no repetition. The auxiliary electronic circuit 490 is in substantially all respects a duplication of the electronic circuit 26 connected, however, to the end transducer 472 rather than to the side transducer 246. From Figure 18, as described above, it is apparent that the auxiliary electronic circuit 490 from the end transducer 472 ties in with the side transducer circuit 26 at the gate-operating solenoid 314. Both electronic circuits 26 and 490 are operable independently by their respective transducers 246 and 472 to energize the solenoid operating coil 316 to shift the gate 292 upon the occurrence of a change in amplitude or frequency, depending upon whether an amplitude modulation or frequency modulation circuit is used. The disturbance thus created by the occurrence of a flaw either in the side portion or end portion of the workpiece thus is amplified and the resulting pulse employed to energize either the sensitive relay 392 or the sensitive relay 512 to close the switch blade 394 or 514 thereof, consequently energizing either the magnetic switches 416 and 434 or the magnetic switches 524 and 542. In either of these events, the consequent closing of the magnetic switch blade 444 or 550 energizes the solenoid operating coil 316 to shift the gate 292 and deflect the faulty workpiece into the discharge chute branch 274, as described above in connection with the operation of the circuit shown in Figure 14.

As stated above, if for extreme sensitivity or from the nature of the workpiece, the simultaneous energization of both the side and end transducers 246 and 472 sets up interference which is not deemed negligible, the side transducer circuit 26 and end transducer circuit 490 are energized separately and alternately merely by adding another cam to the shaft 74 adjacent the cam 84, together with a fourth switch beside the holding switch 104. This fourth switch serves as a selector switch to permit the side transducer circuit 26 to be energized for approximately one and one-half revolutions of the workpiece W and the auxiliary circuit 490 to be energized during the remaining one and one-half revolutions of the workpiece W.

Optionally, the workpieces, such as the bearing rollers described above may be magnetized before inspection, and then placed in proximity to a transducer, the change in the electromagnetic field caused by its interruption by a flaw in the workpiece causing a corresponding change in the current flowing through the coil which, when amplified, actuates the relays and ejection apparatus described above.

The workpieces to be inspected for flaws by the device of the present invention may be of ferrous or non-ferrous metals. Each workpiece has a driven surface to be inspected which has a shape described geometrically as a "surface of revolution." A surface of revolution in the language of solid geometry is defined as a surface traced out by a line rotating around an axis of rotation at a constant distance from the axis of rotation. Thus the straight cylindrical roller and a tapered roller are two special cases of surfaces of revolution of a line rotating parallel with and inclined to the axis of rotation respectively.

What we claim is:

1. A work handling and controlling machine for an electronic flaw-detecting circuit comprising a transducer adapted to be connected to said circuit, a transducer support adapted to carry said transducer, a workpiece rotator having a rotary portion with an internal workpiece-rotating surface of substantially circular cross-section therein disposed adjacent said transducer, means for driving said rotator, a workpiece inlet and a workpiece outlet spaced apart from said transducer, and means for moving the workpiece from said inlet to said transducer into rotative engagement with said rotator, said workpiece rotator having means associated therewith for discharging the workpiece from its position of engagement with said rotator into said outlet, said workpiece-discharging means including a workpiece-releasing opening in said rotary portion communicating with said outlet.

2. A work handling and controlling machine for an electronic flaw-detecting circuit comprising a transducer adapted to be connected to said circuit, a transducer support adapted to carry said transducer, a workpiece rotator having a rotary portion with an internal workpiece-rotating surface of substantially circular cross-section therein disposed adjacent said transducer, means for driving said rotator, a workpiece inlet and a workpiece outlet spaced apart from said transducer, and means disposed within said rotary portion for moving the workpiece from said inlet to said transducer into rotative engagement with said rotator, said workpiece rotator having means associated therewith for discharging the workpiece from its position of engagement with said rotator into said outlet.

3. A work handling and controlling machine for an electronic flaw-detecting circuit comprising a transducer adapted to be connected to said circuit, a transducer support adapted to carry said transducer, a workpiece rotator having a rotary portion with an internal workpiece-rotating surface of substantially circular cross-section therein disposed adjacent said transducer, means for driving said rotator, a workpiece inlet and a workpiece outlet spaced apart from said transducer, and means comprising a rotary feeder disposed within said rotary portion for moving the workpiece from said inlet to said transducer into rotative engagement with said rotator, said workpiece rotator having means associated therewith for discharging the workpiece from its position of engagement with said rotator into said outlet.

4. A work handling and controlling machine for an electronic flaw-detecting circuit comprising a transducer adapted to be connected to said circuit, a transducer support adapted to carry said transducer, a workpiece rotator having a rotary portion with an internal workpiece rotating surface of substantially circular cross-section therein disposed adjacent said transducer, means for driving said rotator, a workpiece inlet and a workpiece outlet spaced apart from said transducer, and means comprising a rotary feeder disposed within said rotary portion and having circumferentially-spaced workpiece-holding recesses open at one end thereof, said inlet communicating with said open ends of said recesses for moving the workpiece from said inlet to said transducer into rotative engagement with said rotator, said workpiece rotator having means associated therewith for discharging the workpiece from its position of engagement with said rotator into said outlet.

5. A work handling and controlling machine for an electronic flaw-detecting circuit comprising a transducer adapted to be connected to said circuit, a transducer support adapted to carry said transducer, a workpiece rotator having a rotary portion with an internal workpiece-rotating surface of substantially circular cross-section therein disposed adjacent said transducer, means for driving said rotator, a workpiece inlet and a workpiece outlet spaced apart from said transducer, and means comprising a rotary feeder disposed coaxially within said rotary portion with its periphery spaced inwardly away from said workpiece-rotating surface to provide an annular space therebetween for moving the workpiece from said inlet to said transducer into rotative engagement with said rotator, said transducer being mounted in said annular space, said workpiece rotator having means associated therewith for discharging the workpiece from its position of engagement with said rotator into said outlet.

6. A work handling and controlling machine for an electronic flaw-detecting circuit comprising a transducer adapted to be connected to said circuit, a transducer support adapted to carry said transducer, a workpiece rotator having a rotary portion with an internal workpiece-rotating surface of substantially circular cross-section therein disposed adjacent said transducer, means for driving said rotator, a workpiece inlet and a workpiece outlet spaced apart from said transducer, and means associated therewith comprising a rotary feeder disposed coaxially within said rotary portion with its periphery spaced inwardly away from said workpiece-rotating surface to provide an annular space therebetween for moving the high-frequency-oscillating magnetic field of said into rotative engagement with said rotator, said transducer being mounted in said annular recess below and substantially in a vertical plane passing through the common axis of rotation of said rotator and feeder, whereby to position the workpiece slightly to one side of the vertical below said axis of rotation while engaging the high-frequency-oscillating magnetic field of said transducer, said workpiece rotator having means associated therewith for discharging the workpiece from its position of engagement with said rotator into said outlet.

7. A work handling and controlling machine for an electronic flaw-detecting circuit comprising a transducer adapted to be connected to said circuit, a transducer support adapted to carry said transducer, a workpiece rotator having a rotary portion with an internal workpiece-rotating surface of substantially circular cross-section therein disposed adjacent said transducer, means for driving said rotator, a workpiece inlet and a workpiece outlet spaced apart from said transducer, means comprising a rotary feeder disposed coaxially within said rotary portion with its periphery spaced inwardly away from said workpiece-rotating surface to provide an annular space therebetween for moving the workpiece from said inlet to said transducer into rotative engagement with said rotator, said transducer being mounted in said annular space, said workpiece rotator having means associated therewith for discharging the workpiece from its position of engagement with said rotator into said outlet, and a workpiece guide in said annular space extending from said workpiece inlet to a location adjacent said transducer.

8. A work handling and controlling machine for an electronic flaw-detecting circuit comprising a transducer adapted to be connected to said circuit, a transducer support adapted to carry said transducer, a workpiece rotator having a rotary portion with an internal workpiece-rotating surface of substantially circular cross-section therein disposed adjacent said transducer, means for driving said rotator, a workpiece inlet and a workpiece outlet spaced apart from said transducer, means comprising a rotary feeder disposed coaxially within said rotary portion and having spaced peripheral workpiece-holding recesses, said feeder having its periphery spaced inwardly away from said workpiece-rotating surface to provide an annular space therebetween, and a workpiece guide in said annular space extending from said workpiece inlet to a location adjacent said transducer for moving the workpiece from said inlet to said transducer into rotative engagement with said rotator, said workpiece guide at a location adjacent said transducer being spaced radially away from said workpiece moving means whereby to permit the workpiece to drop out of its recess upon arrival at said transducer, said workpiece rotator having means associated therewith for discharging the workpiece from its position of engagement with said rotator into said outlet.

9. A work handling and controlling machine for an electronic flaw-detecting circuit for tapered workpieces with conical surfaces, said machine comprising a transducer adapted to be connected to said circuit, a transducer support adapted to carry said transducer, a workpiece-rotator having a rotary portion with a conical internal workpiece-rotating surface disposed adjacent said transducer, the apex of said conical internal workpiece-rotating surface being disposed substantially in coincidence with the apex of the external conical surface of a workpiece in rolling engagement therewith, means for driving said rotator, a workpiece inlet and a workpiece outlet spaced apart from said transducer, and means for moving the workpiece from said inlet to said transducer into rotative engagement with said rotator, said workpiece rotator having means associated therewith for discharging the workpiece from its position of engagement with said rotator into said outlet.

References Cited in the file of this patent

UNITED STATES PATENTS

| | | |
|---|---|---|
| Re. 21,927 | Brace et al. | Oct. 21, 1941 |
| 2,051,695 | Glacy | Aug. 18, 1936 |
| 2,429,891 | Neff | Oct. 28, 1947 |
| 2,566,767 | Hunt | Sept. 4, 1951 |
| 2,570,485 | Reiber | Oct. 9, 1951 |
| 2,573,824 | Baker | Nov. 6, 1951 |
| 2,648,435 | Kodis | Aug. 11, 1953 |
| 2,778,497 | Bickley | Jan. 22, 1957 |